United States Patent [19]

Brandenstein et al.

[11] 4,448,294
[45] May 15, 1984

[54] CLUTCH RELEASE BEARING HAVING VIBRATION DAMPING MATERIAL

[75] Inventors: Manfred Brandenstein, Eussenheim; Lothar Walter, Schweinfurt; Armin Olschewski, Schweinfurt; Wolfgang Hüber, Schweinfurt; Wolfgang Friedrich, Schweinfurt, all of Fed. Rep. of Germany

[73] Assignee: SKF Kugellagerfabriken GmbH, Schweinfurt, Fed. Rep. of Germany

[21] Appl. No.: 248,061

[22] Filed: Mar. 27, 1981

[30] Foreign Application Priority Data

Mar. 28, 1980 [DE] Fed. Rep. of Germany ....... 3012019

[51] Int. Cl.³ ............................................. F16D 23/14
[52] U.S. Cl. .................................... 192/30 V; 192/98; 192/110 B
[58] Field of Search ................. 192/30 V, 70.29, 70.3, 192/89 B, 98, 99 A, 110 B; 308/184 A

[56] References Cited

U.S. PATENT DOCUMENTS

| 3,038,459 | 6/1962 | Schmid | 74/519 X |
|---|---|---|---|
| 3,525,557 | 8/1970 | Willing | 308/233 |
| 3,604,545 | 9/1971 | Bourgeois | 192/98 |
| 3,625,327 | 12/1971 | Birdsey | 192/98 X |
| 3,631,954 | 1/1972 | Coaley | 192/98 |
| 3,741,361 | 6/1973 | Brandenstein | 192/98 X |
| 3,921,775 | 11/1975 | Matyschik | 192/98 |
| 4,033,440 | 7/1977 | Ladin | 192/98 |
| 4,126,216 | 11/1978 | Babcock et al. | 192/89 B |
| 4,201,282 | 5/1980 | Ernst et al. | 192/89 B X |
| 4,306,641 | 12/1981 | Olschewski et al. | 192/30 V X |

FOREIGN PATENT DOCUMENTS

| 6604658 | 2/1970 | Fed. Rep. of Germany . |
| 1945234 | 3/1971 | Fed. Rep. of Germany .... 192/89 B |
| 2236113 | 1/1975 | France ................. 192/98 |

Primary Examiner—Rodney H. Bonck
Attorney, Agent, or Firm—Daniel M. Rosen

[57] ABSTRACT

A clutch has a bearing adapted to be axially movable by means of an actuating member, so that the bearing can move into and out of engagement with a clutch lever, such as a diaphragm spring or cup-spring. A ring of vibration damping material is mounted on either the bearing ring or clutch lever to damp the passage of vibration therebetween, and a layer of wear resistant material may be provided on the ring of damping material.

4 Claims, 7 Drawing Figures

CLUTCH RELEASE BEARING HAVING VIBRATION DAMPING MATERIAL

This invention relates to a clutch that may be engaged and disengaged in operation, especially for motor vehicles, comprised of a throw-out bearing arranged to be axially displaceable in the axial direction against the diaphragm or cup-spring of the cluth, for the release of the clutch, under the control of an operating mechanism.

In known clutches of the above type, the clutch lever or the tongues of the diaphragm or cup-springs directly mechanically contact the throw-out bearing, i.e., the contact ring of the bearing. In operation, especially during the process of releasing the clutch, this leads to vibration and noise, which impairs the traveling comfort. In a similar manner the vibrations can be transmitted from the bearing itself to the clutch lever or the diaphragm or plate spring and from there to the clutch housing, whereby the clutch lever or the diaphragm or cup-spring in the housing amplify the noise as resonant bodies.

A clutch throw-out bearing, in the form of a rolling bearing, is known, in which a ring of plastic or another noise damping material is positioned in the bore of the inner ring or on the outer surface of the outer ring, as disclosed in Bourgeois, U.S. Pat. No. 3,604,545 and Coaley, U.S. Pat. No. 3,631,954, respectively corresponding to German reference numbers DE-PS No. 1,944,839, DE-OS No. 2,009,643. In these known arrangements, only the development of noise of the rolling bodies is damped and reduced, but the transmission of vibration and noise to other parts of the clutch is, on the contrary, not prevented.

Arrangements for release of vehicle clutches having movable throw-out bearings are known, in which the facing side of the throw-out bearing, adapted to engage the coupling lever, has an elastic covering extending in the axial and radial direction. This elastic coating serves to automatically center the throw-out bearing with respect to the clutch axis, and to compensate for possible wobbling oscillations of the clutch (DE-GM No. 6,604,658). This arrangement is not directed to the noise or vibration damping of a clutch throw-out bearing.

The present invention is therefore directed to the production of a clutch of the above type, in which the transmission of vibration and noise between the bearing and the clutch lever, i.e., the plate or cup-spring, is effectively prevented.

In accordance with the invention, this objective is attained by providing a clutch throw-out arrangement in which the throw-out bearing is isolated for vibration from the clutch lever, i.e., the diaphragm spring. For this purpose, a ring of vibration damping material is arranged on one of the parts that come into contact with one another during operation of the clutch, i.e., the coupling lever, e.g., diaphragm or cup-spring, or a bearing ring. As a result, transmission of vibrations and consequently also noise from the throw-out bearing to the clutch lever, i.e., diaphragm or plate spring and vice versa is effectively prevented.

In a further embodiment of the invention the ring of vibration damping material is arranged either on the clutch lever, i.e., the clutch diaphragm spring, or on that part of the bearing ring that comes into contact with the clutch lever.

The ring of vibration damping material, in accordance with a further feature of the invention, is formed to be elastically deformable in the axial direction, so that it is possible for the ring to become deformed in the axial direction.

Advantageously the ring projects in the axial direction, sufficiently far toward the other part with which it comes into contact during operation of the clutch, that, due to pressure of the throw-out force in the clutch the ring is deformed to such an extent that the clutch lever, i.e., the diaphragm or cup-spring can come into contact, in the disengaged condition of the clutch, with the metallic surface of the contact ring, i.e., bearing ring of the device. In the embodiment of the invention wherein the ring of vibration damping material is provided on the bearing ring, advantageously the ring is annular and is set into a recess in the side of the bearing ring facing the clutch lever. The depth of this recess or the projection of the ring of oscillation damping material beyond the bearing ring is so chosen that the bearing ring can come into contact with the clutch, i.e., the diaphragm or cup-spring upon the application of the greatest clutch throw-out force.

In a further embodiment of the invention the ring of vibration damping material is arranged to be radially outwardly displaced against the contact surface of the clutch lever, i.e., the diaphragm or cup-spring. This arrangement has the advantage that at the start of a clutch release operation the clutch lever, i.e., the diaphragm spring, is in contact solely with the ring of vibration damping material, while as the clutch release operation continues, the ends of the clutch lever, i.e., the diaphragm spring, only then come into contact with the metallic parts of the throw-out bearing.

In order to prevent the ring of vibration damping material from wearing out too rapidly, in accordance with a further feature of the invention, the ring of vibration damping material is provided, on the side away from the part to which it is affixed, and directed toward the other part of the clutch, with a layer of a wear resistant material.

In order that the invention will be more clearly understood, it will now be disclosed in greater detail with reference to the accompanying drawing, wherein.

Figure 1:
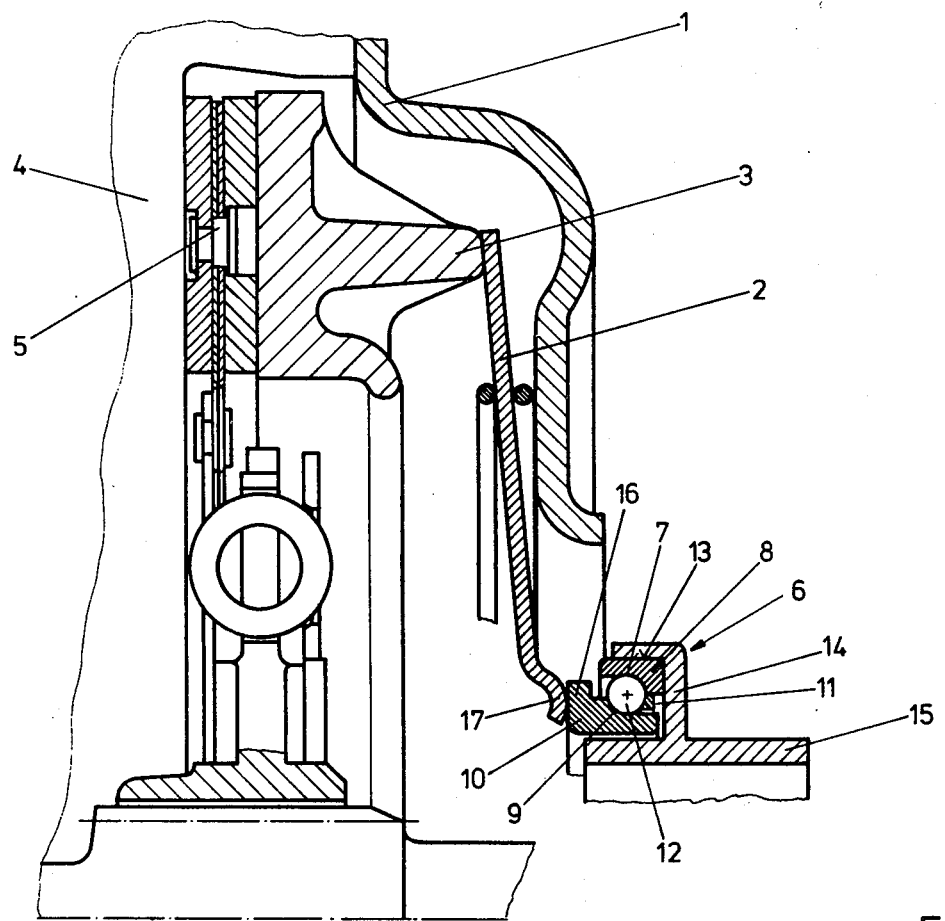
FIG. 1 is a longitudinal cross-section of an arrangement of a clutch with a throw-out bearing.

Referring now to FIG. 1, therein is illustrated a clutch composed of a clutch housing 1 having a diaphragm or cup-spring 2 engaging a pressure ring 3, and a clutch disc 5 positioned between the pressure ring 3 and the fly wheel 4. A throw-out bearing 6 is arranged in the region of the radially inner ends of the diaphragm or plate springs 2, and an operating element (not shown) is adapted to engage the throw-out bearing in the conventional manner, for operation of the clutch. The throw-out bearing 6 is comprised of an outer ring 8 having an outer race 7, an inner ring 10 having an inner race 9, and a plurality of rolling bodies 12, such as balls, positioned in a cage 11 and running between the inner and outer rings. The outer ring 8 is positioned in the bore 13 of a flange provided on sliding sleeve 15. The sliding sleeve 15 is slidably guided along a guide tube (not shown) in conventional manner. The inner ring 10 has a radially outwardly directed flange 16, on the end thereof facing the clutch, the flange 16 serving as a contact ring for the ends 17 of the diaphragm or cup-spring 2.

Figure 2:
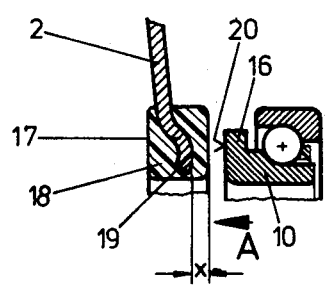
FIG. 2 is a cross-section of a portion of the contact region between the clutch diaphragm spring and rotating bearing ring of the throw-out bearing, in accordance with one embodiment of the invention.
Figure 3:
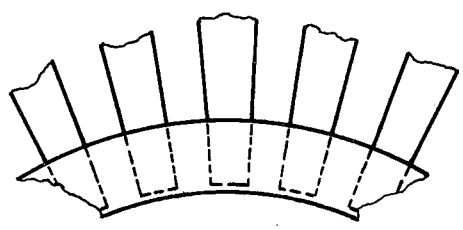
FIG. 3 is a side view of a portion of the clutch arrangement of FIG. 2, taken in the direction of the arrow A.

As illustrated in FIG. 2, the ends 17 of the diaphragm or cup-spring 2 are enclosed by a ring 18 of vibration damping material. This ring 18 extends a distance "x" from the outer facing surfaces 19 of the ends 17 of the diaphragm or plate springs 2, i.e., in the direction towards the throw-out bearing.

In the operation of the clutch in accordance with the invention, the bearing 6 is displaced in the axial direction (toward the left) by the (not shown) operating element, against the diaphragm or plate spring 2. The facing surface 20 of the radially outwardly extending flange 16 of the inner ring thereby comes into contact with the ring 18 of vibration damping material. Under the reaction of the clutch throw-out force, the portion of the ring 18 which extends axially for the distance "x" is elastically deformed, until the flange 16 reaches practically to the surface of the ends of the diaphragm or cup-springs, whereby these springs 2 are displaced further to the left and thereby lift the contact ring, which was under a spring force, from the clutch disc 5. In this condition the clutch is released, and force or turning movement transmission no longer exists.

Figure 4:
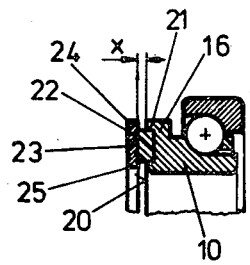
FIG. 4 is a cross-sectional view of a portion of a clutch arrangement in accordance with a further embodiment of the invention.

In the embodiment of the invention illustrated in FIG. 4, an annular recess 21 is provided in the facing surface 20 of the flange 16 of the inner ring 10, and the ring 22 of vibration damping material engages this recess. On the forward facing side of the ring 22, which extends from the facing surface 20 of the flange 16 a distance of "x", a washer 23 of wear resistant material is affixed to the ring 22. This washer 23 of wear resistant material is adapted to contact the ends of the diaphragm or cup-springs 2. In operation of the clutch, the ring 22 of vibration damping material is so far elastically deformed in the axial direction, under the reaction of the throw-out force, that the overlapping edges 24 and 25 of the washer 23 engage the facing side 20 of the flange 16 of the inner ring.

Figure 5:
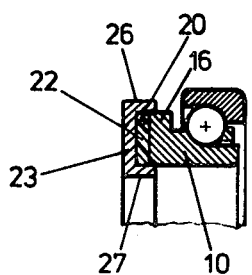
FIG. 5 is a cross-sectional view of a clutch arrangement in accordance with a still further embodiment of the invention.

The embodiment of the invention illustrated in FIG. 5 is fabricated in a manner somewhat similar to that of FIG. 4. In this arrangement, however, the ring 22 of vibration damping material extends directly from the facing surface 20 of the flange 16 of the inner ring 10, and is affixed thereto, for example, by vulcanization. The washer 23 of wear resistant material, which is affixed to the forward facing surface of the ring 22, has an axially directed annular edges 26, 27 at its radially outer and inner circumferential edges respectively, the edges 26, 27, extending generally toward the bearing. The annular edges 26, 27 enclose the circumferential surfaces of the flange 16 of the inner ring with minimum play.

Figure 6:
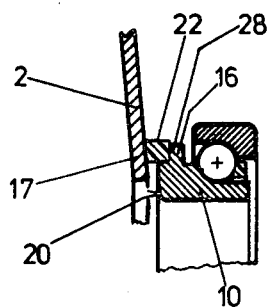
FIG. 6 is a cross-sectional view of a clutch arrangement in accordance with another embodiment of the invention.

In the embodiment of the invention illustrated in FIG. 6, the ring 22 of vibration damping material is set in an annular recess 28 at the outer circumference of the flange 16 of the inner ring 10. The contact between the ring 22 and the ends 17 of the diaphragm or plate spring 2 is thereby displaced somewhat radially outwardly, and the end sections of the diaphragm or cup spring 2 can come into direct contact with the facing surface 20 of the flange 16 of inner ring 10 after a determined axial deformation of the ring 22 of vibration damping material.

Figure 7:
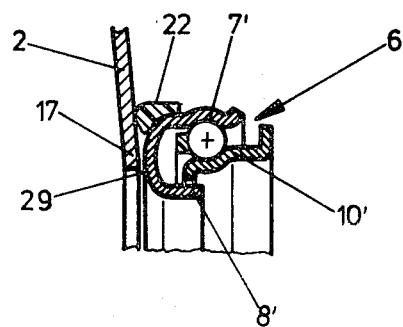
FIG. 7 is a cross-sectional view of a portion of a clutch arrangement in accordance with still another embodiment of the invention.

In the embodiment of the invention illustrated in FIG. 7, the throw-out bearing 6 is comprised of sheet steel formed bearing rings 8' and 10', whereby, in this case, the outer ring 8' is formed to extend around the forward side of the bearing, and contact the diaphragm or cup-spring 2. A ring 22 of vibration damping material is provided on the outer ring 8' in the region of the transition between the contacting flange surface 29 thereof and the portion thereof provided with the race 7'. The ring 22 projects a very small distance beyond the contact surface of the flange portion 29. In operation of the clutch, when the throw-out bearing 6 is axially displaced in the direction of the diaphragm or cup-spring 2, first the ring 22 of vibration damping material comes into contact with the end section 17 of the diaphragm or cup-spring 2. The ring 22 is then so deformed, as a result of the clutch release force, that the ends of the diaphragm or cup-spring 2 come into contact with the contact surface of the flange 29 of the outer ring 8'.

The invention is not limited to the above disclosed embodiments thereof. Thus, variations and modifications may be made in the construction of the invention. For example, the invention is not limited to a clutch employing a throw-out bearing having rolling bodies. The invention may thus alternatively employ a throw-out bearing in the form of a sliding bearing. In addition, in a known manner, additional precautions may be taken for vibration and noise damping. For example only, in a known manner rings of noise damping material may be positioned on or in the bearing rings.

What is claimed is:

1. In a clutch comprising a throw-out bearing having a bearing ring, said bearing being mounted for axial displacement by movement of an actuating member to move said bearing ring into and out of engagement with a clutch lever; said clutch lever having an end for contact with the bearing ring, the improvement comprising a ring of vibration damping material mounted on said bearing ring to vibration damp engagement between said clutch lever end and said bearing, said ring of vibration damping material being elastically deformable in the axial direction and projecting axially beyond the contact surface of said bearing ring adapted to engage said clutch lever only sufficiently far that it can be deformed by pressure of said actuating member to permit engagement between said surface and said clutch lever.

2. The clutch of claim 1 wherein said ring of vibration damping material is positioned in a recess on the face of said bearing ring toward said clutch lever.

3. The clutch of claim 1 wherein said ring of vibration damping material is positioned on said bearing ring radially outwardly displaced from the surface of said bearing ring adapted to engage said clutch lever.

4. In a clutch comprising a throw-out bearing having a bearing ring, said bearing being mounted for axial displacement by movement of an actuating member to move said bearing ring into and out of engagement with a clutch lever; said clutch lever having an end for contact with the bearing ring; the improvement comprising a ring of vibration damping material mounted to vibration damp engagement between said clutch lever end and said bearing, said ring of vibration damping material being elastically deformable in the axial direction and projecting axially between the contact surface of said clutch lever adapted to engage said bearing only sufficiently far that under pressure of said actuating member said surface can engage said bearing ring.

* * * * *